United States Patent
Lee et al.

(10) Patent No.: US 11,140,744 B2
(45) Date of Patent: Oct. 5, 2021

(54) METHOD AND APPARATUS FOR RESTRICTING TO RECEIVE A SYSTEM INFORMATION IN A WIRELESS COMMUNICATION SYSTEM

(71) Applicant: LG ELECTRONICS INC., Seoul (KR)

(72) Inventors: Youngdae Lee, Seoul (KR); Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 13 days.

(21) Appl. No.: 16/669,750

(22) Filed: Oct. 31, 2019

(65) Prior Publication Data

US 2020/0146100 A1    May 7, 2020

Related U.S. Application Data

(60) Provisional application No. 62/754,552, filed on Nov. 1, 2018.

(51) Int. Cl.
| | |
|---|---|
| *H04W 4/90* | (2018.01) |
| *H04W 76/38* | (2018.01) |
| *H04W 76/50* | (2018.01) |
| *G05D 1/00* | (2006.01) |
| *G07C 5/00* | (2006.01) |
| *H04W 4/40* | (2018.01) |

(52) U.S. Cl.
CPC .......... *H04W 76/38* (2018.02); *G05D 1/0022* (2013.01); *G07C 5/008* (2013.01); *H04W 4/40* (2018.02); *H04W 4/90* (2018.02); *H04W 76/50* (2018.02)

(58) Field of Classification Search
CPC ....... H04W 76/38; H04W 4/90; H04W 76/50; H04W 4/40; G05D 1/0022; G07C 5/008
USPC ................ 370/329; 455/418, 550.1, 423
See application file for complete search history.

(56) References Cited

U.S. PATENT DOCUMENTS

| | | | |
|---|---|---|---|
| 8,751,023 B2 * | 6/2014 | Lu ........................ | G06F 16/60 700/94 |
| 9,672,734 B1 * | 6/2017 | Ratnasingam ....... | G08G 1/0968 |
| 2015/0052224 A1 * | 2/2015 | Kitahara ............ | H04N 21/2353 709/219 |
| 2015/0208327 A1 * | 7/2015 | Baratam ............... | H04W 48/16 455/432.1 |
| 2017/0019776 A1 * | 1/2017 | Chuang ................... | H04W 4/90 |
| 2017/0223097 A1 * | 8/2017 | Zhang ................. | H04L 67/1097 |
| 2020/0097038 A1 * | 3/2020 | Kinnerk .................... | G06F 1/14 |
| 2020/0100138 A1 * | 3/2020 | Wu ........................ | H04L 1/1848 |
| 2020/0374847 A1 * | 11/2020 | Liu ................... | H04W 74/0833 |

* cited by examiner

*Primary Examiner* — Danh C Le
(74) *Attorney, Agent, or Firm* — Dentons US LLP

(57) ABSTRACT

A method and apparatus for restricting to receive a system information in a wireless communication system is provided. A wireless device receives, from a network, a first transmission of a system information. A wireless device starts a timer related to the system information. A wireless device skips to read a second transmission of the system information, while the timer is running.

13 Claims, 12 Drawing Sheets

METHOD AND APPARATUS FOR RESTRICTING TO RECEIVE A SYSTEM INFORMATION IN A WIRELESS COMMUNICATION SYSTEM

CROSS-REFERENCE TO RELATED APPLICATION

Pursuant to 35 U.S.C. § 119 (e), this application claims the benefit of U.S. Provisional Application No. 62/754,552, filed on Nov. 1, 2018, the contents of which are all hereby incorporated by reference herein in their entirety.

BACKGROUND

Technical Field

The present disclosure relates to a method and apparatus for restricting to receive a system information in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A public warning system (PWS) refers to a warning information provider that detects disasters and warning conditions and provides a warning to operators, and a general warning notification system provided by a mobile communication provider that delivers warning information directly to a terminal. The PWS provides services to distribute Earthquake and Tsunami Warning System (ETWS), Commercial Mobile Alert System (CMAS), Korean Public Alert System (KPAS), and European Public Warning System (EU-Alert) warning messages in GSM, UMTS, E-UTRAN, and NG-RAN When an etwsAndCmasIndication is transmitted via Short Message, a wireless device acquires or re-acquires a SIB1. When the SIB1 includes scheduling information for other SIBs, the wireless device shall acquire the other SIBs to receive a warning message(s).

SUMMARY

A network continuously broadcasts warning messages for a long time due to emergency situations. Since a wireless device continuously receives the same warning message(s) for a long time, the wireless device may consume unnecessary power and resource. Therefore, a method and apparatus for restricting to receive a system information in a wireless communication system is required.

In an aspect, a method performed by a wireless device in a wireless communication system is provided. The method includes receiving, from a network, a first transmission of a system information. The method includes starting a timer related to the system information. The method includes skipping to read a second transmission of the system information, while the timer is running.

In another aspect, a wireless device in a wireless communication system is provided. The wireless device includes a memory, a transceiver, and a processor, operably coupled to the memory and the transceiver. The processor of the wireless device is configured to control the transceiver to receive, from a network, a first transmission of a system information. The processor of the wireless device is configured to start a timer related to the system information. The processor of the wireless device is configured to skip reading a second transmission of the system information, while the timer is running.

In another aspect, a processor for a wireless device in a wireless communication system is provided. The processor is configured to control the wireless device to receive, from a network, a first transmission of a system information. The processor is configured to start a timer related to the system information. The processor is configured to skip reading a second transmission of the system information, while the timer is running.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only 01-DMA may be used for DL and only SC-FDMA may be used for UL. Alternatively, 01-DMA and SC-1-DMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
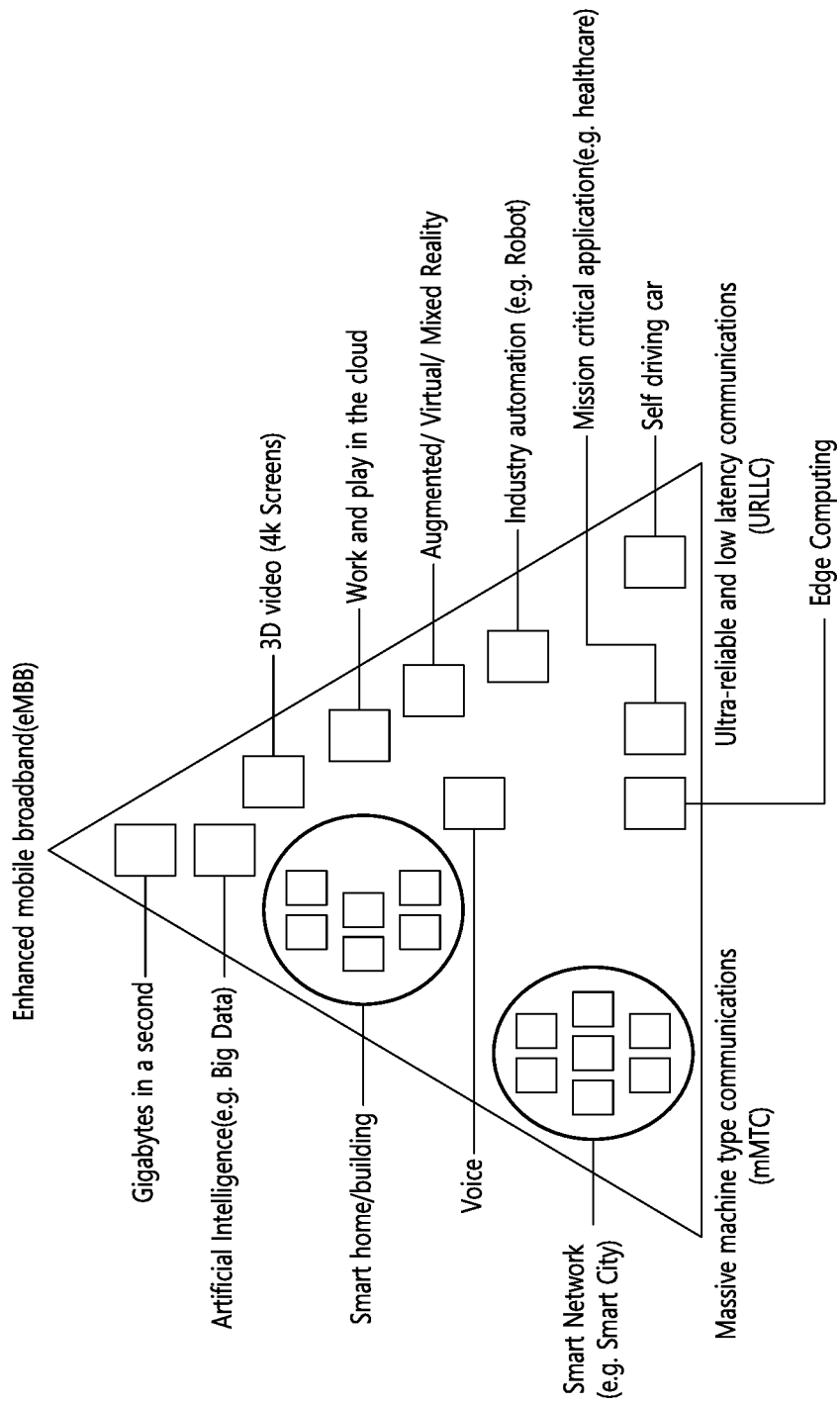
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
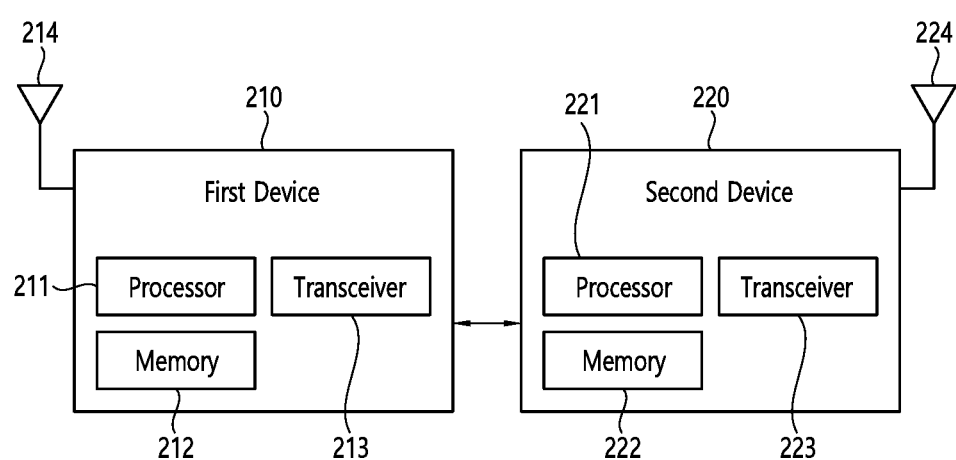
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
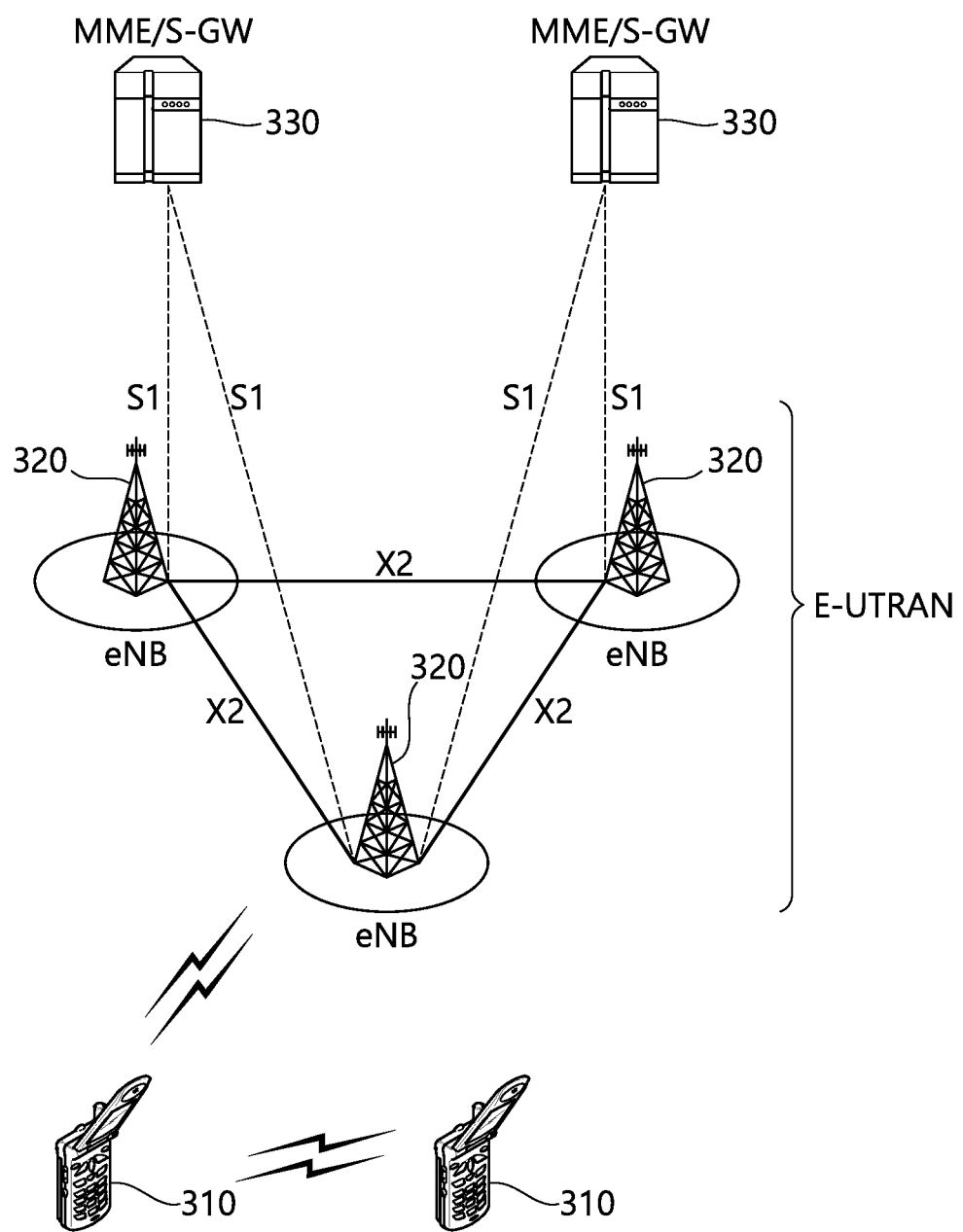
FIG. 3 shows another example of a wireless communication system to which the technical features of the present disclosure can be applied.

FIG. 3 shows another example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10.

The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
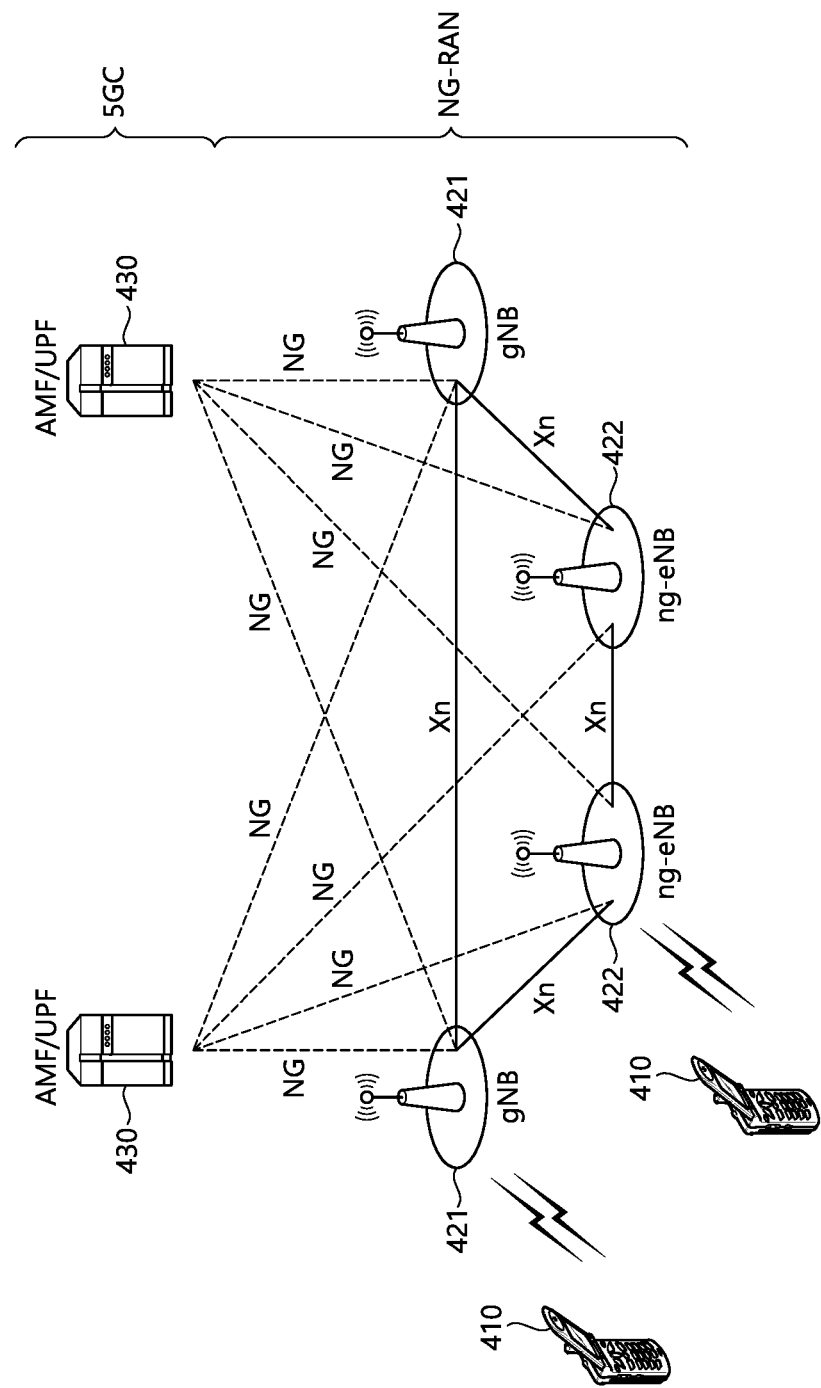
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional 5-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
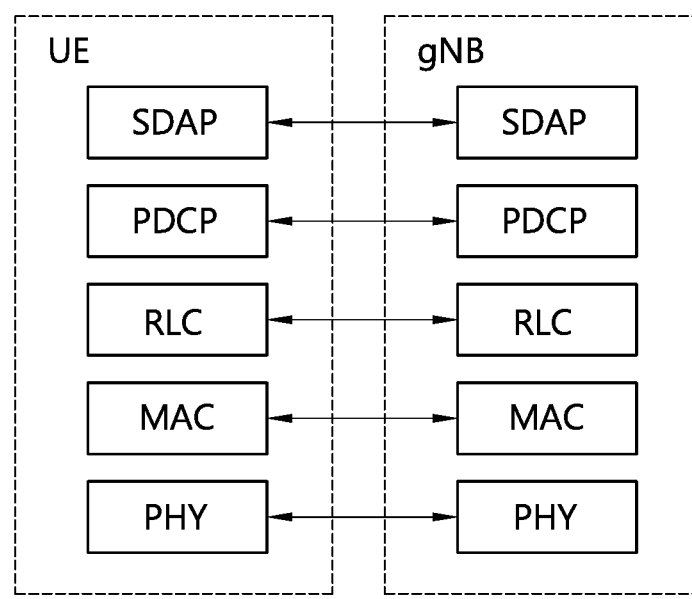
FIG. 5 shows a block diagram of a user plane protocol stack to which the technical features of the present disclosure can be applied.
Figure 6:
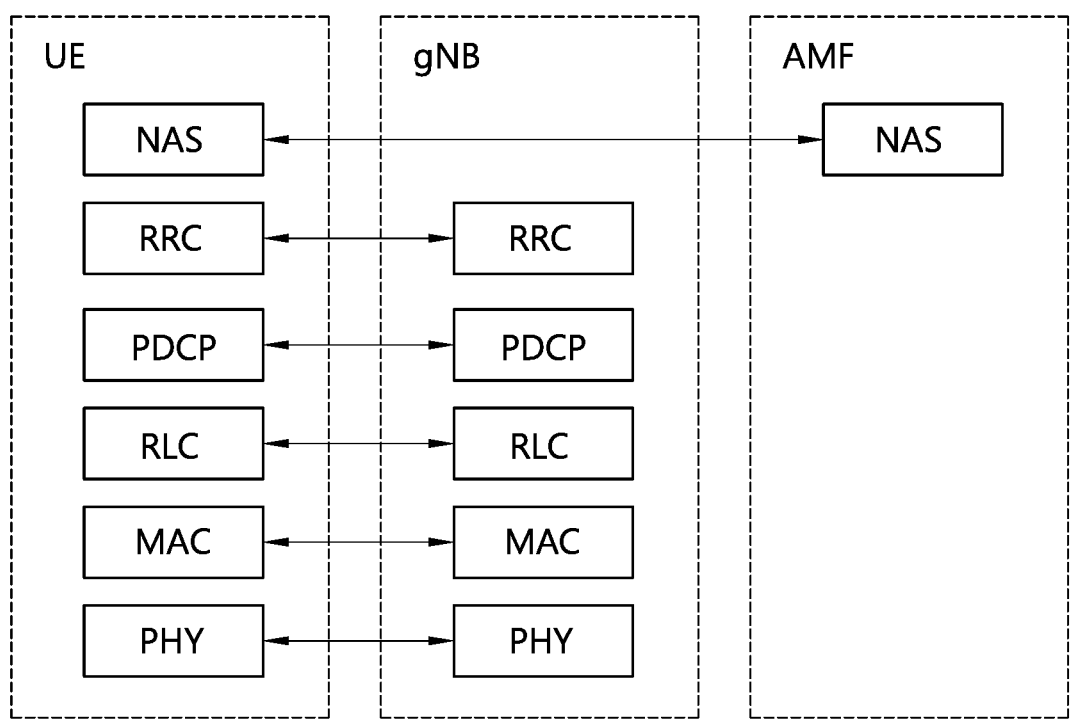
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concat-enation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5 GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, system information will be described. It may be referred to as Section 5.2 of 3GPP TS 38.331 V15.3.0 (2018-09).

System Information (SI) is divided into the MIB and a number of SIBs where:

the MIB is always transmitted on the BCH with a periodicity of 80 ms and repetitions made within 80 ms and it includes parameters that are needed to acquire SIB1 from the cell. The first transmission of the MIB is scheduled in subframes and repetitions are scheduled according to the period of SSB;

the SIB1 is transmitted on the DL-SCH with a periodicity of 160 ms and variable transmission repetition periodicity. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3, SIB1 transmission repetition period is the same as the SSB period. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systeminformation-AreaID;

For a UE in RRC_CONNECTED, the network can provide system information through dedicated signalling using the RRCReconfiguration message, e.g. if the UE has an active BWP with no common search space configured.

For PSCell and SCells, the network provides the required SI by dedicated signalling, i.e. within an RRCReconfiguration message. Nevertheless, the UE shall acquire MIB of the PSCell to get SFN timing of the SCG (which may be different from MCG). Upon change of relevant SI for SCell, RAN releases and adds the concerned SCell. For PSCell, SI can only be changed with Reconfiguration with Sync.

General UE requirements is described. The UE applies the SI acquisition procedure to acquire the AS- and NAS information. The procedure applies to UEs in RRC_IDLE, in RRC_INACTIVE and in RRC_CONNECTED.

The UE in RRC_IDLE and RRC_INACTIVE shall ensure having a valid version of (at least) the MIB, SIB1 through SIB4 and SIB5 (if the UE supports E-UTRA).

SI validity is described. The UE shall apply the SI acquisition procedure upon cell selection (e.g. upon power on), cell-reselection, return from out of coverage, after reconfiguration with sync completion, after entering the network from another RAT, upon receiving an indication that the system information has changed, upon receiving a PWS notification; whenever the UE does not have a valid version of a stored SI.

When the UE acquires a MIB or a SIB1 or a SI message in a serving cell, the UE shall store the acquired SI. A version of the SI that the UE stored is no longer valid 3 hours after acquisition. The UE may use a valid stored version of the SI except MIB and SIB1 e.g. after cell re-selection, upon return from out of coverage or after the reception of SI change indication.

The storage and management of the stored SI in addition to the SI valid for the current serving cell is left to UE implementation.

The UE shall:
1> delete any stored version of a SIB after 3 hours from the moment it was successfully confirmed as valid;
1> for each stored version of a SIB:
2> if the areaScope value of the stored version of the SIB is the same as the value received from the serving cell:
3> if the stored SIB has an area scope and if the first PLMN-Identity included in the PLMN-IdentityInfo-List, the systemInformationAreaID and the valueTag that are included in the SIB1 received from the serving cell are identical to the PLMN-Identity, the systeminformationAreaID and the valueTag associated with the stored version of that SIB; or
3> if the stored SIB is cell specific and if valueTag and CellIdentity included in the SIB1 received from the serving cell is identical to the valueTag and CellIdentity associated with stored version of that SIB;
4> consider the stored SIB as valid for the cell;

SI change indication and public warning system (PWS) notification is described. A modification period is used, i.e. updated SI (other than for Earthquake Tsunami. Warning System (ETWS) and Commercial Mobile Alert System (CMAS)) is broadcasted in the modification period following the one where SI change indication is transmitted. The modification period boundaries are defined by SFN values for which SFN mod m=0, where m is the number of radio frames comprising the modification period. The modification period is configured by system information. The UE receives indications about SI modifications and/or PWS notifications using Short Message transmitted with P-RNTI over DCI. Repetitions of SI change indication may occur within preceding modification period.

UEs in RRC_IDLE or in RRC_INACTIVE shall monitor for SI change indication in its own paging occasion every DRX cycle. UEs in RRC_CONNECTED shall monitor for SI change indication in any paging occasion at least once per modification period if the UE is provided with common search space to monitor paging.

ETWS or CMAS capable UEs in RRC_IDLE or in RRC_INACTIVE shall monitor for indications about PWS notification in its own paging occasion every DRX cycle. ETWS or CMAS capable UEs in RRC_CONNECTED shall monitor for indication about PWS notification in any paging occasion at least once per modification period if the UE is provided with common search space to monitor paging.

If the UE receives a Short Message, the UE shall:
1> if the UE is ETWS capable or CMAS capable, and the etwsAndCmasIndication bit of Short Message is set:
2> immediately re-acquire the SIB1;
2> if the UE is ETWS capable and si-SchedulingInfo includes scheduling information for SIB6:
3> acquire SIB6 immediately;
2> if the UE is ETWS capable and si-SchedulingInfo includes scheduling information for SIB7:
3> acquire SIB7 immediately;
2> if the UE is CMAS capable and si-SchedulingInfo includes scheduling information for SIB8:

3> acquire SIB8 immediately;
1> if the systemInfoModification bit of Short Message is set:
2> apply the SI acquisition procedure from the start of the next modification period.

Acquisition of MIB and SIB1 is described.
The UE shall:
1> apply the specified BCCH configuration;
1> if the UE is in RRC_CONNECTED and the cell is a PSCell:
2> acquire the MIB;
1> else if the UE is in RRC_CONNECTED with an active BWP with common search space configured and has received an indication about change of system information:
2> acquire the SIB1

The UE is only required to acquire broadcasted SIB1 if the UE can acquire it without disrupting unicast data reception, i.e. the broadcast and unicast beams are quasi co-located.

Acquisition of an SI message is described.
When acquiring an SI message, the UE shall:
1> determine the start of the SI-window for the concerned SI message as follows:
2> for the concerned SI message, determine the number n which corresponds to the order of entry in the list of SI messages configured by schedulingInfoList in si-SchedulingInfo in SIB1;
2> determine the integer value x=(n−1)*w, where w is the si-WindowLength;
2> the SI-window starts at the slot # a, where a=x mod N, in the radio frame for which SFN mod T=FLOOR(x/N), where T is the si-Periodicity of the concerned SI message and N is the number of slots in a radio frame;
1> if SI message acquisition is not triggered due to UE request:
2> receive the PDCCH containing the scheduling RNTI, i.e. SI-RNTI, from the start of the SI-window and continue until the end of the SI-window whose absolute length in time is given by si-WindowLength, or until the SI message was received;
2> if the SI message was not received by the end of the SI-window, repeat reception at the next SI-window occasion for the concerned SI message;

The UE is only required to acquire broadcasted SI message if the UE can acquire it without disrupting unicast data reception, i.e. the broadcast and unicast beams are quasi co-located.
1> perform the actions for the acquired SI message;

Actions upon reception of the SIB1 is described.
Upon receiving the SIB1 the UE shall:
1> store the acquired SIB1;
1> if the cellAccessRelatedInfo contains an entry with the PLMN-Identity of the selected PLMN:
2> in the remainder of the procedures use plmn-IdentityList, trackingAreaCode, and cellIdentity for the cell as received in the corresponding PLMN-IdentityInfo containing the selected PLMN;
1> if in RRC_CONNECTED while T311 is not running:
2> disregard the frequencyBandList, if received, while in RRC_CONNECTED;
2> forward the cellIdentity to upper layers;
2> forward the trackingAreaCode to upper layers;
1> else:
2> if one or more of the frequency bands indicated in the frequencyBandList for downlink and one or more of the frequency bands indicated in the frequencyBandList for uplink or one or more of the frequency bands indicated in the frequencyBandList for supplementary uplink, if configured, are part of the frequency bands supported by the UE and they are not downlink only bands, and the UE supports at least one additionalSpectrumEmission in the NR-NS-PmaxList within the frequencyBandList of FrequencyInfoUL-SIB for FDD or of FrequencyInfoDL-SIB for TDD for the frequency band selected by the UE (for the downlink and uplink or supplementary uplink, if configured):
3> forward the cellIdentity to upper layers;
3> forward the trackingAreaCode to upper layers;
3> forward the ims-Emergency Support to upper layers, if present;
3> forward the eCallOverIMS-Support to upper layers, if present;
3> apply the configuration included in the servingCellConfigCommonSIB;
3> apply the specified PCCH configuration;
3> if the UE has a stored valid version of a SIB that the UE requires to operate within the cell:
4> use the stored version of the required SIB;
3> if the UE has not stored the valid version of one or several required SIB(s):
4> for the SI message(s) that, according to the si-SchedulingInfo, contain at least one required SIB and for which si-BroadcastStatus is set to broadcasting:
5> acquire the SI message(s);
4> for the SI message(s) that, according to the si-SchedulingInfo, contain at least one required SIB and for which si-BroadcastStatus is set to notBroadcasting:
5> trigger a request to acquire the SI message(s);
3> apply the first listed additionalSpectrumEmission which it supports among the values included in NR-NS-PmaxList within frequencyBandList;
3> if the additionalPmax is present in the same entry of the selected additionalSpectrumEmission within NR-NS-PmaxList:
4> apply the additionalPmax;
3> else:
4> apply the p-Max;
2> else:
3> consider the cell as barred; and
3> perform barring as if intraFreqReselection is set to notAllowed;

Hereinafter, connection control will be described. It may be referred to as Section 5.3 of 3GPP TS 38.331 V15.3.0 (2018-09).

Paging is described. The purpose of this procedure is to transmit paging information to a UE in RRC_IDLE or RRC_INACTIVE.

The network initiates the paging procedure by transmitting the Paging message at the UE's paging occasion. The network may address multiple UEs within a Paging message by including one PagingRecord for each UE.

Upon receiving the Paging message, the UE shall:
1> if in RRC_IDLE, for each of the PagingRecord, if any, included in the Paging message:
2> if the ue-Identity included in the PagingRecord matches the UE identity allocated by upper layers:
3> forward the ue-Identity and accessType (if present) to the upper layers;
1> if in RRC_INACTIVE, for each of the PagingRecord, if any, included in the Paging message:
2> if the ue-Identity included in the PagingRecord matches the UE's stored I-RNTI:

3> if the UE is configured by upper layers with access identity 1:
4> initiate the RRC connection resumption procedure with resumeCause set to MPS-PriorityAccess;
3> else if the UE is configured by upper layers with access identity 2:
4> initiate the RRC connection resumption procedure with resumeCause set to MCS-PriorityAccess;
3> else if the UE is configured by upper layers with one or more access identities equal to 11-15:
4> initiate the RRC connection resumption procedure with resumeCause set to highPriorityAccess;
3> else:
4> initiate the RRC connection resumption procedure with resumeCause set to mt-Access;
2> else if the ue-Identity included in the PagingRecord matches the UE identity allocated by upper layers:
3> forward the ue-Identity to upper layers and accessType (if present) to the upper layers;
3> perform the actions upon going to RRC_IDLE with release cause 'CN paging'.

Message definitions are described.

SIB1 contains information relevant when evaluating if a UE is allowed to access a cell and defines the scheduling of other system information. It also contains radio resource configuration information that is common for all UEs and barring information applied to the unified access control.

The SystemInformation message is used to convey one or more System Information Blocks. All the SIBs included are transmitted with the same periodicity.

The IE SI-SchedulingInfo contains information needed for acquisition of SI messages.

SIB6 contains an ETWS primary notification.
SIB7 contains an ETWS secondary notification.
SIB8 contains a CMAS notification.

Short messages can be transmitted on PDCCH using P-RNTI with or without associated Paging message using Short Message field in DCI format 1_0.

Table 3 defines Short Messages, below. Bit 1 is the most significant bit.

TABLE 3

| Bit | Short message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | Not used in this release of the specification, and shall be ignored by UE if received. |

Meanwhile, whenever a UE receives the etwsAndCmas-Indication bit via Short Message transmitted within PDCCH addressed to P-RNTI, the UE immediately re-acquires a SIB1. If si-SchedulingInfo in the SIB1 includes scheduling information for SIB6, SIB7, and/or SIB8, the UE shall acquire the SIBs to receive a warning message(s).

However, since a network (for example, a gNB) may continuously broadcast warning message(s) via SIB(s) for a long time due to emergency situations, a UE may continuously receive the Short Message indicating the etwsAndC-masIndication bit set to 1. Whenever a UE receives the Short Message in Paging Occasions, the UE may receive the same warning message(s). Therefore, the UE may consume unnecessary power for receiving the same warning message(s) for a long time.

Hereinafter, a method and apparatus for restricting to receive a system information in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 7:
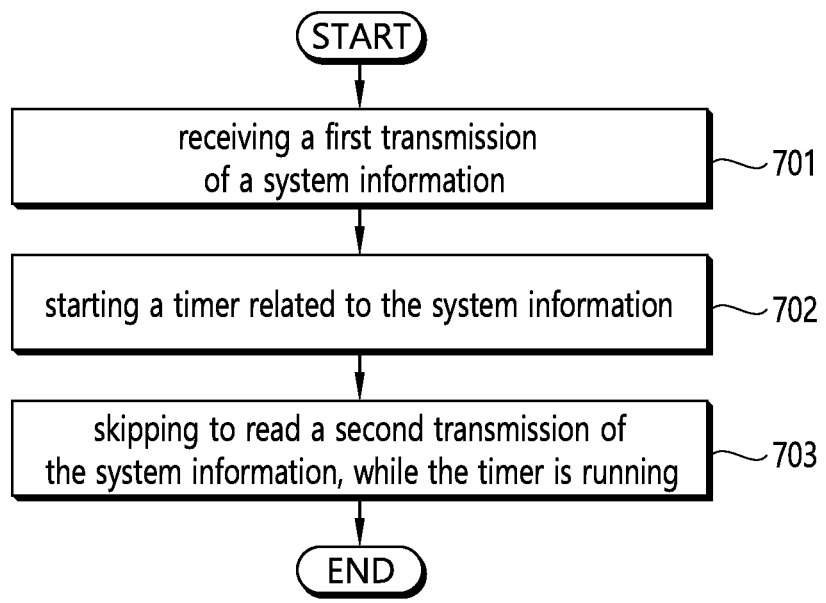
FIG. 7 shows an example of a method for restricting to receive a system information, according to some embodiments of the present disclosure.

FIG. 7 shows an example of a method for restricting to receive a system information, according to some embodiments of the present disclosure.

In step 701, a wireless device may receive, from a network, a first transmission of a system information.

According to some embodiments of the present disclosure, a wireless device may monitor a paging occasion to receive an indication for the system information. For example, a wireless device may monitor a channel in the paging occasion. The channel may be a Paging Channel or Physical Downlink Channel addressed to P-RNTI.

For example, an indication may inform that the system information is transmitted from the network. When a wireless device receives the indication for a particular system information, the wireless device may acquire the particular system information.

According to some embodiments of the present disclosure, a system information may be a system information (SI) message, a system information block (SIB), a type of SIB, and/or a warning message. For example, the warning message may carry ETWS data and/or CMAS data. The SIB may include the warning message or a segment of the warning message.

In step 702, a wireless device may start a timer related to a system information. The timer may be started based on that the warning message is received or all segments of the warning message are received. For example, if a system information includes a segment of a warning message, the timer may be started when the wireless device receives a complete warning message via plurality transmissions of the system information.

According to some embodiments of the present disclosure, a timer may be configured per a system information. For example, a first timer may be configured for a first system information and a second timer may be configured for a second system information. The first timer may be started based on that a wireless device receives a transmission of a first system information. The first timer may be started and be expired independently with the second timer. While the first timer is running, if the second timer is not started (or the second timer is expired), the wireless device may receive a transmission of a second system information. When the wireless device may receive, from a network, a first transmission of second system information, the wireless device may start the second timer related to the second system information. The wireless device may skip to read a second transmission of the second system information, while the second timer is running. The second timer is different from the first timer.

In step 703, a wireless device may skip reading a second transmission of the system information, while the timer is running. For example, while the wireless device monitors the paging occasion, the wireless device may receive an indication for the system information, while the timer is running. However, even though the wireless device receives the indication for the system information, the wireless device may skip to re-acquire the system information, while the timer is running.

According to some embodiments of the present disclosure, a wireless device may ignore an indication from a channel in a paging occasion, while the timer is running. When a wireless device needs an effort to receive the indication from the channel, the wireless device may save energy or power to receive the indication by ignoring the indication.

According to some embodiments of the present disclosure, a wireless device may receive an indication for the system information, after the timer is expired. When the wireless device receives the indication for the system information, the wireless device may re-acquire the system information. That is, the wireless device may receive a third transmission of the system information, after the timer is expired.

According to some embodiments of the present disclosure, the wireless device may be an autonomous driving apparatus in communication with at least one of a mobile terminal, a network, and/or autonomous vehicles other than the wireless device.

Figure 8:
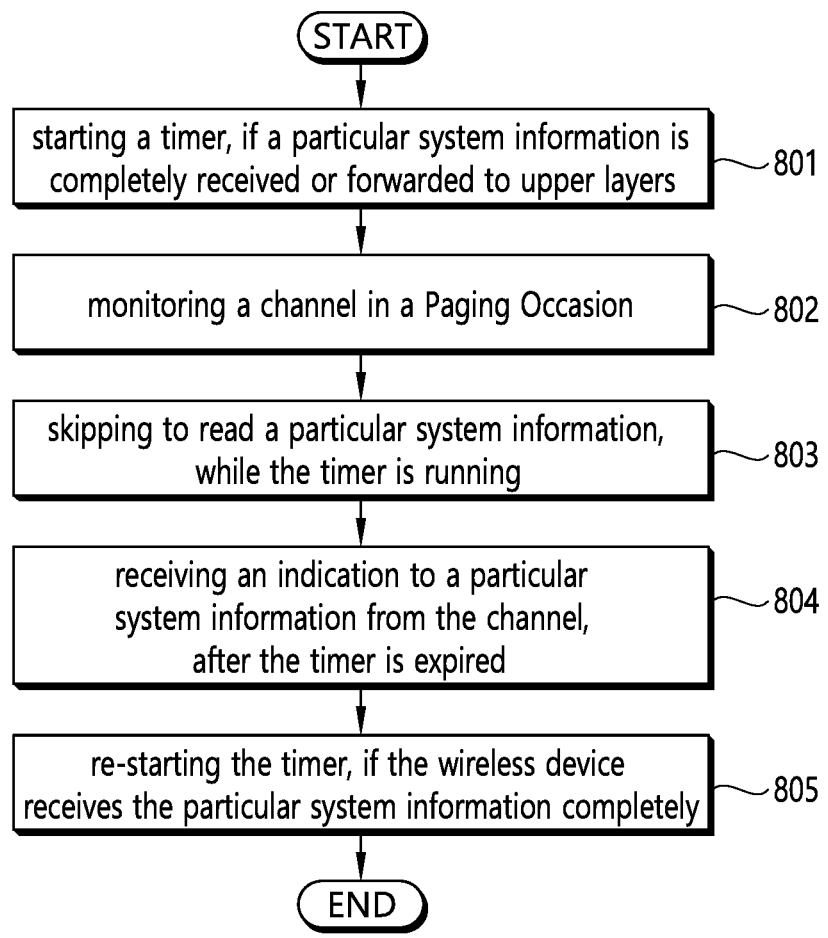
FIG. 8 shows an example of a method for restricting to receive a system information, according to some embodiments of the present disclosure.

FIG. 8 shows an example of a method for restricting to receive a system information, according to some embodiments of the present disclosure.

In step 801, a wireless device may start a timer, if a particular system information is completely received or forwarded to upper layers.

According to some embodiments of the present disclosure, the particular system information may be a warning message carrying ETWS or CMAS data. For example, the particular system information may be a System Information Block (SIB) carrying the warning message.

According to some embodiments of the present disclosure, a SIB may contain a complete warning message or a segment of a warning message.

According to some embodiments of the present disclosure, if all segments of the warning message are received and all segments of the warning message are assembled as a complete warning message, a wireless device may consider that the particular system information is completely received.

In step 802, a wireless device may monitor a channel on a Paging Occasion.

According to some embodiments of the present disclosure, the channel may be a Paging Channel or a Physical Downlink Control Channel addressed to P-RNTI.

In step 803, a wireless device may skip reading a particular system information while the timer is running A wireless device may ignore the indication, while the timer is running A wireless device may skip reading a particular system information, if the wireless device receives an indication to a particular system information from the channel, while the timer is running A wireless device may ignore the indication, if the wireless device receives an indication to a particular system information from the channel, while the timer is running.

According to some embodiments of the present disclosure, the indication may be carried in the Short Message which is carried on the Physical Downlink Control Channel addressed to P-RNTI.

According to some embodiments of the present disclosure, the indication may be the etwsAndCmasIndication bit of Short Message which is set to 1.

In step 804, a wireless device may receive an indication to a particular system information from the channel, after the timer is expired. When the wireless device receives the indication of the particular system information, the wireless device may re-acquire the system information.

In step 805, a wireless device may re-start the timer, if the wireless device receives the particular system information completely.

That is, in step 804 and step 805, after the timer is expired, if a wireless device receives indication of a particular system information from the channel, the wireless device may completely receive the particular system information and re-start the timer.

Figure 9:
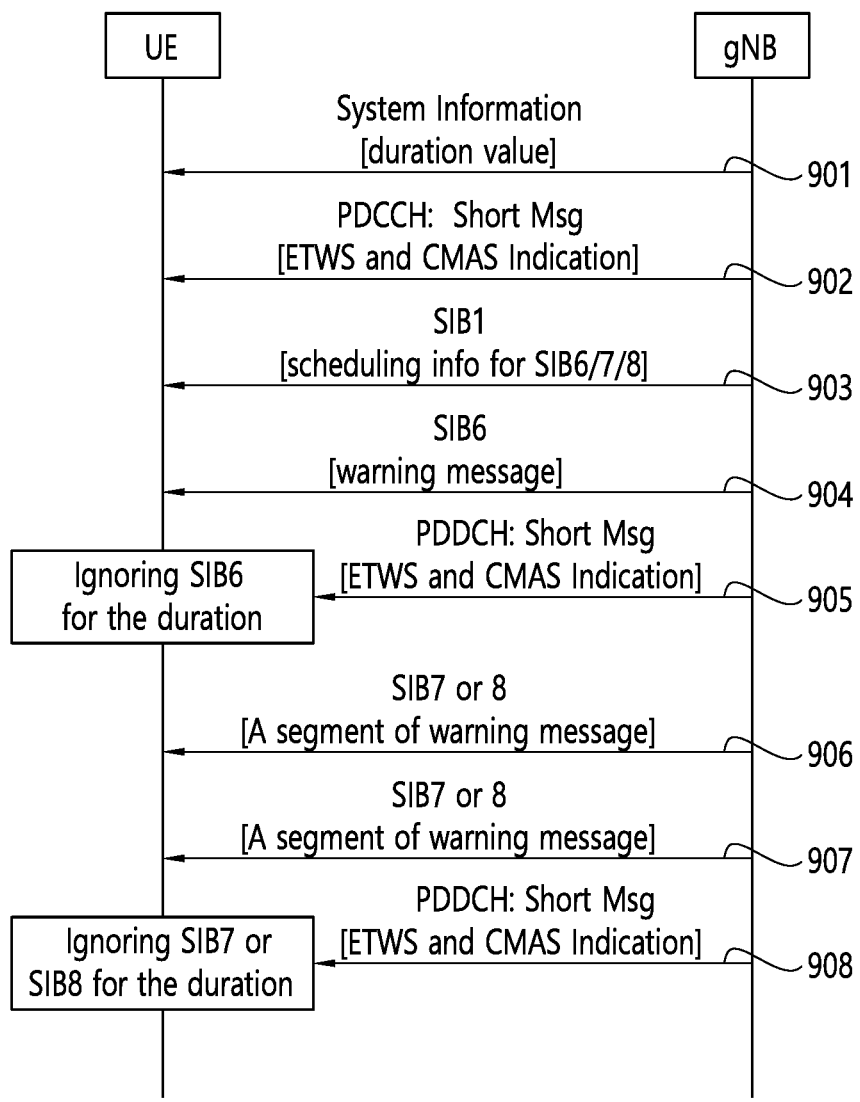
FIG. 9 shows an example of a method for restricting to receive a system information, according to some embodiments of the present disclosure.

FIG. 9 shows an example of a method for restricting to receive a system information, according to some embodiments of the present disclosure.

In step 901, a wireless device (for example, a UE) may receive a system information from a network (for example, a gNB). For example, the system information may include a duration value related to one or more of system information blocks (for example, SIB6, SIB7, and/or SIB8). For example, the system information may include an information of a timer related to one or more of system information blocks (for example, SIB6, SIB7, and/or SIB8).

In step 902, a wireless device may receive a short message from the gNB. The short message may be carried on the Physical Downlink Control Channel which is addressed to a paging-radio network temporary identity (P-RNTI). The short message may include an indication for a particular system information. For example, the indication may be an etwsAndCmasIndication bit of the short message set to 1.

According to some embodiments of the present disclosure, a wireless device may monitor a channel in a paging occasion to receive an indication for a particular system information. When a wireless device receives an indication for the particular system information, the wireless device may acquire the particular system information, such as a SIB1, a SIB6, a SIB7, and/or a SIB8.

In step 903, a wireless device may receive a system information block 1 (SIB1) from the gNB. The SIB1 may include scheduling information for a SIB6, a SIB7, and/or a SIB8. The wireless device may receive a SIB1 based on the indication included in the short message.

In step 904, a wireless device may receive a SIB6. The SIB6 may include a warning message. For example, a SIB6 may contain an ETWS primary notification. The wireless device may receive the SIB6 based on the scheduling information included in the SIB1.

According to some embodiments of the present disclosure, a wireless device may start a timer related to the SIB6, based on that the wireless device receives the SIB6. The timer related to the SIB6 may be configured by the received system information received from step 901.

In step 905, a wireless device may ignore SIB6 for a duration from receiving the SIB6 in the step 904. The duration may be configured by the system information in step 901. For example, a wireless device may ignore to receive a transmission of the SIB6, even though there is a short message including an indication for the SIB6, for the duration. After the duration, the wireless device may receive another transmission of the SIB6 based on another short message from the gNB.

According to some embodiments of the present disclosure, a wireless device may skip reading other SIB6, while a timer related to the SIB6 is running. The timer may be configured by the system information, received from the gNB in step 901. After the timer is expired, the wireless device may receive another transmission of the SIB6 based on another short message from the gNB.

In step 906, a wireless device may receive a SIB7 and/or a SIB8. The SIB7 and/or the SIB8 may include a segment of a warning message, respectively. For example, the wireless device may receive the SIB7 and/or the SIB8 based on the scheduling information included in the SIB1 received from the gNB in step 903. For example, a SIB7 may include a segment of an ETWS secondary notification. For example, a SIB8 may include a segment of a CMAS notification. The wireless device may receive one or more of SIB7s or SIB8s to receive a complete warning message.

According to some embodiments of the present disclosure, the SIB7 and/or the SIB8 may include a complete warning message. For example, a SIB7 may include a complete ETWS secondary notification. For example, a SIB8 may include a complete CMAS notification.

According to some embodiments of the present disclosure, a wireless device may have timers related to the SIB7 and the SIB8, respectively. The timers may be configured by the system information received from the gNB in step 901, respectively. For example, a timer related to the SIB7 may be different from a timer related to the SIB8.

According to some embodiments of the present disclosure, a wireless device may start a timer related to the SIB7 when the wireless device receives all segments of the warning message via the SIB7. For example, a wireless device may start the timer related to the SIB7 when all segments of the warning message are received and all segments of the warning message are assembled as a complete warning message.

According to some embodiments of the present disclosure, a wireless device may start a timer related to the SIB8 when the wireless device receives all segments of the warning message via the SIB8. For example, a wireless device may start the timer related to the SIB8 when all segments of the warning message are received and all segments of the warning message are assembled as a complete warning message.

In step 907, a wireless device may ignore SIB7 or SIB8 for the duration from receiving the SIB7 or the SIB8 in step 906. The duration may be configured by the system information received from the gNB in step 901. The duration related to the SIB7 or the SIB8 may be configured respectively. That is, a duration related to the SIB7 is different from a duration related to the SIB8. In addition, the duration related to the SIB7 and the duration related to the SIB8 may be different from the duration related to the SIB6, in step 905.

For example, a wireless device may ignore to receive other SIB7, even if there is a short message including the etwsAndCmasIndication which is set to 1 from the gNB, for the duration. After the duration related to the SIB7, the wireless device may receive another SIB7 based on another short message from the gNB.

For example, a wireless device may ignore to receive other SIB8, even if there is a short message including the etwsAndCmasIndication which is set to 1 from the gNB, for the duration. After the duration related to the SIB8, the wireless device may receive another SIB8 based on another short message from the gNB.

According to some embodiments of the present disclosure, a wireless device may skip reading other SIB7, while a timer related to the SIB7 is running. The timer related to the SIB7 may be configured by the system information received from the gNB in step 901. After the timer is expired, the wireless device may receive another SIB7 based on another short message from the gNB.

According to some embodiments of the present disclosure, a wireless device may skip reading other SIB8, while a timer related to the SIB8 is running. The timer related to the SIB8 may be configured by the system information received from the gNB in step 901. After the timer is expired, the wireless device may receive another SIB8 based on another short message from the gNB.

Hereinafter, acquiring system information, such as SI change indication and PWS notification, according to some embodiments of the present disclosure, will be described.

According to some embodiments of the present disclosure, a modification period is used, i.e. updated SI (other than for ETWS and CMAS) is broadcasted in the modification period following the one where SI change indication is transmitted. The modification period boundaries are defined by SFN values for which SFN mod m=0, where m is the number of radio frames comprising the modification period. The modification period is configured by system information. The UE receives indications about SI modifications and/or PWS notifications using Short Message transmitted with P-RNTI over DCI. Repetitions of SI change indication may occur within the preceding modification period.

UEs in RRC_IDLE or in RRC_INACTIVE shall monitor for SI change indication in its own paging occasion every DRX cycle. UEs in RRC_CONNECTED shall monitor for SI change indication in any paging occasion at least once per modification period if the UE is provided with common search space to monitor paging.

ETWS or CMAS capable UEs in RRC_IDLE or in RRC_INACTIVE shall monitor for indications about PWS notification in its own paging occasion every DRX cycle. ETWS or CMAS capable UEs in RRC_CONNECTED shall monitor for an indication about PWS notification in any paging occasion at least once per modification period if the UE is provided with common search space to monitor paging.

If the UE receives a Short Message from PDCCH addressed to P-RNTI on a paging occasion, UE performs one of the options below:

For options 1 and 2 below, how to determine duration value (N) will be described.

According to some embodiments of the present disclosure, UE can determine the N value shown the above options by using one of the alternatives:

Alt 1: N is broadcasted via system information.

Alt 2: N is determined by using one of the existing parameter broadcast in SIB1 or other SIB. For example, N is determined as a defaultPagingCycle or a multiple of a defaultPagingCycle broadcast in SIB1. For example, N is determined as the length of the BCCH modification period or a multiple of the length broadcast in SIB 1.

Alt 3: N is a fixed value.

Option 1 will be described. In option 1, a UE skips receiving SIB6, SIB7 or SIB8 for N seconds after receiving SIB 1.

If the UE receives a Short Message, the UE shall:
1> if the UE is ETWS capable or CMAS capable, and the etwsAndCmasIndication bit of Short Message is set to 1:
2> immediately re-acquire the SIB1;
2> if the UE is ETWS capable, more than [1\T seconds] elapsed since reception of the last SIB6 if previously received, and si-SchedulingInfo includes scheduling information for SIB6:
3> acquire SIB6, immediately;
2> if the UE is ETWS capable, more than [N seconds] elapsed since reception of all segments of the last warning message from SIB7 if previously received, and si-SchedulingInfo includes scheduling information for SIB7:
3> acquire SIB7, immediately;
2> if the UE is CMAS capable, more than [1\T seconds] elapsed since reception of all segments of the last warning message from SIB8 in the current modification period if previously received in the current modification period, and si-SchedulingInfo includes scheduling information for SIB8:
3> acquire SIB8, immediately;
1> if the systemInfoModification bit of Short Message is set:
2> apply the SI acquisition procedure from the start of the next modification period.

In option 1, actions upon reception of SIB6 may be performed as below.
Upon receiving the SIB6 the UE shall:
1> forward the received warningType, messageIdentifier and serialNumber to upper layers;

In option 1, actions upon reception of SIB7 may be performed as below.
Upon receiving the SIB7 the UE shall:
1> if there is no current value for messageIdentifier and serialNumber for SIB7; or
1> if either the received value of messageIdentifier or of serialNumber or of both are different from the current values of messageIdentifier and serialNumber for SIB7:
2> use the received values of messageIdentifier and serialNumber for SIB7 as the current values of messageIdentifier and serialNumber for SIB7;
2> discard any previously buffered warningMessageSegment;
2> if all segments of a warning message have been received:
3> assemble the warning message from the received warningMessageSegment;
3> forward the received warning message, messageIdentifier, serialNumber and dataCodingScheme to upper layers;
3> stop reception of SIB7;
3> discard the current values of messageIdentifier and serialNumber for SIB7;
2> else:
3> store the received warningMessageSegment;
3> continue reception of SIB7;
1> else if all segments of a warning message have been received:
2> assemble the warning message from the received warningMessageSegment;
2> forward the received complete warning message, messageIdentifier, serialNumber and dataCodingScheme to upper layers;
2> stop reception of SIB7;
2> discard the current values of messageIdentifier and serialNumber for SIB7;
1> else:
2> store the received warningMessageSegment;
2> continue reception of SIB7;

The UE should discard any stored warningMessageSegment and the current value of messageIdentifier and serialNumber for SIB7 if the complete warning message has not been assembled within a period of 3 hours.

In option 1, actions upon reception of SIB8 may be performed as below.
Upon receiving the SIB8 the UE shall:
1> if the SIB8 contains a complete warning message and the complete geographical area coordinates (if any):
2> forward the received warning message, messageIdentifier, serialNumber, dataCodingScheme and the geographical area coordinates (if any) to upper layers;
2> continue reception of SIB8;
1> else:
2> if the received values of messageIdentifier and serialNumber are the same (each value is the same) as a pair for which a warning message and the geographical area coordinates (if any) are currently being assembled:
3> store the received warningMessageSegment;
3> store the received warningAreaCoordinatesSegment (if any);
3> if all segments of a warning message and geographical area coordinates (if any) have been received:
4> assemble the warning message from the received warningMessageSegment;
4> assemble the geographical area coordinates from the received warningAreaCoordinatesSegment (if any);
4> forward the received warning message, messageIdentifier, serialNumber, dataCodingScheme and geographical area coordinates (if any) to upper layers;
4> stop assembling a warning message and geographical area coordinates (if any) for this messageIdentifier and serialNumber and delete all stored information held for it;
3> continue reception of SIB8;
2> else if the received values of messageIdentifier and/or serialNumber are not the same as any of the pairs for which a warning message is currently being assembled:
3> start assembling a warning message for this messageIdentifier and serialNumber pair;
3> start assembling the geographical area coordinates (if any) for this messageIdentifier and serialNumber pair;
3> store the received warningMessageSegment;
3> store the received warningAreaCoordinatesSegment (if any);
3> continue reception of SIB8;

The UE should discard warningMessageSegment and warningAreaCoordinatesSegment (if any) and the associated values of messageIdentifier and serialNumber for SIB8 if the complete warning message and the geographical area coordinates (if any) have not been assembled within a period of 3 hours.

The number of warning messages that a UE can re-assemble simultaneously is a function of UE implementation.

Option 2 will be described. In option 2, a UE ignores the etwsAndCmasIndication bit of Short Message and skips receiving SIB1 as well as SIB6, SIB7 or SIB8 for N seconds.
If the UE receives a Short Message, the UE shall:
1> if the UE is ETWS capable or CMAS capable, more than [1\T seconds] elapsed since the last warning message has been received, assembled and forwarded to upper layers if previously received, and the etwsAndCmasIndication bit of Short Message is set to 1:
2> immediately re-acquire the SIB1;
2> if the UE is ETWS capable, and si-SchedulingInfo includes scheduling information for SIB6:
3> acquire SIB6, immediately;
2> if the UE is ETWS capable, and si-SchedulingInfo includes scheduling information for SIB7:
3> acquire SIB7, immediately;
2> if the UE is CMAS capable, and si-SchedulingInfo includes scheduling information for SIB8:
3> acquire SIB8, immediately;
1> if the systemInfoModification bit of Short Message is set:
2> apply the SI acquisition procedure from the start of the next modification period.

In option 2, actions upon reception of SIB6 may be performed as below.
Upon receiving the SIB6 the UE shall:
1> forward the received warningType, messageIdentifier and serialNumber to upper layers;

In option 2, actions upon reception of SIB7 may be performed as below.
Upon receiving the SIB7 the UE shall:
1> if there is no current value for messageIdentifier and serialNumber for SIB7; or
1> if either the received value of messageIdentifier or of serialNumber or of both are different from the current values of messageIdentifier and serialNumber for SIB7:
2> use the received values of messageIdentifier and serialNumber for SIB7 as the current values of messageIdentifier and serialNumber for SIB7;
2> discard any previously buffered warningMessageSegment;
2> if all segments of a warning message have been received:
3> assemble the warning message from the received warningMessageSegment;
3> forward the received warning message, messageIdentifier, serialNumber and dataCodingScheme to upper layers;
3> stop reception of SIB7;
3> discard the current values of messageIdentifier and serialNumber for SIB7;
2> else:
3> store the received warningMessageSegment;
3> continue reception of SIB7;
1> else if all segments of a warning message have been received:
2> assemble the warning message from the received warningMessageSegment;
2> forward the received complete warning message, messageIdentifier, serialNumber and dataCodingScheme to upper layers;
2> stop reception of SIB7;
2> discard the current values of messageIdentifier and serialNumber for SIB7;
1> else:
2> store the received warningMessageSegment;
2> continue reception of SIB7;
The UE should discard any stored warningMessageSegment and the current value of messageIdentifier and serialNumber for SIB7 if the complete warning message has not been assembled within a period of 3 hours.

In option 2, actions upon reception of SIB8 may be performed as below.
Upon receiving the SIB8 the UE shall:
1> if the SIB8 contains a complete warning message and the complete geographical area coordinates (if any):
2> forward the received warning message, messageIdentifier, serialNumber, dataCodingScheme and the geographical area coordinates (if any) to upper layers;
2> continue reception of SIB8;
1> else:
2> if the received values of messageIdentifier and serialNumber are the same (each value is the same) as a pair for which a warning message and the geographical area coordinates (if any) are currently being assembled:
3> store the received warningMessageSegment;
3> store the received warningAreaCoordinatesSegment (if any);
3> if all segments of a warning message and geographical area coordinates (if any) have been received:
4> assemble the warning message from the received warningMessageSegment;
4> assemble the geographical area coordinates from the received warningAreaCoordinatesSegment (if any);
4> forward the received warning message, messageIdentifier, serialNumber, dataCodingScheme and geographical area coordinates (if any) to upper layers;
4> stop assembling a warning message and geographical area coordinates (if any) for this messageIdentifier and serialNumber and delete all stored information held for it;
3> continue reception of SIB8;
2> else if the received values of messageIdentifier and/or serialNumber are not the same as any of the pairs for which a warning message is currently being assembled:
3> start assembling a warning message for this messageIdentifier and serialNumber pair;
3> start assembling the geographical area coordinates (if any) for this messageIdentifier and serialNumber pair;
3> store the received warningMessageSegment;
3> store the received warningAreaCoordinatesSegment (if any);
3> continue reception of SIB8;
The UE should discard warningMessageSegment and warningAreaCoordinatesSegment (if any) and the associated values of messageIdentifier and serialNumber for SIB8 if the complete warning message and the geographical area coordinates (if any) have not been assembled within a period of 3 hours.
The number of warning messages that a UE can re-assemble simultaneously is a function of UE implementation.

Option 3 will be described. In option 3, timer based skipping SIB1 and SIB6/7/8 could be performed.
UE receives a value of Timer X via system information. (If the value of Time X is not received via system information, UE assumes Timer X is not running.)
If the UE receives a Short Message, the UE shall:
1> if the UE is ETWS capable or CMAS capable, Timer X is not running, and the etwsAndCmasIndication bit of Short Message is set to 1:
2> immediately re-acquire the SIB1;
2> if the UE is ETWS capable, and si-SchedulingInfo includes scheduling information for SIB6:
3> acquire SIB6, immediately;
2> if the UE is ETWS capable, and si-SchedulingInfo includes scheduling information for SIB7:

3> acquire SIB7, immediately;
2> if the UE is CMAS capable, and si-SchedulingInfo includes scheduling information for SIB8:
3> acquire SIB8, immediately;
1> if the systemInfoModification bit of Short Message is set:
2> apply the SI acquisition procedure from the start of the next modification period.

In option 3, actions upon reception of SIB6 may be performed as below.

Upon receiving the SIB6 the UE shall:
1> forward the received warningType, messageIdentifier and serialNumber to upper layers;
1> starts or re-starts Timer X.

In option 3, actions upon reception of SIB7 may be performed as below.

Upon receiving the SIB7 the UE shall:
1> if there is no current value for messageIdentifier and serialNumber for SIB7; or
1> if either the received value of messageIdentifier or of serialNumber or of both are different from the current values of messageIdentifier and serialNumber for SIB7:
2> use the received values of messageIdentifier and serialNumber for SIB7 as the current values of messageIdentifier and serialNumber for SIB7;
2> discard any previously buffered warningMessageSegment;
2> if all segments of a warning message have been received:
3> assemble the warning message from the received warningMessageSegment;
3> forward the received warning message, messageIdentifier, serialNumber and dataCodingScheme to upper layers;
3> stop reception of SIB7;
3> starts or re-starts Timer X;
3> discard the current values of messageIdentifier and serialNumber for SIB7;
2> else:
3> store the received warningMessageSegment;
3> continue reception of SIB7;
1> else if all segments of a warning message have been received:
2> assemble the warning message from the received warningMessageSegment;
2> forward the received complete warning message, messageIdentifier, serialNumber and dataCodingScheme to upper layers;
2> stop reception of SIB7;
2> starts or re-starts Timer X;
2> discard the current values of messageIdentifier and serialNumber for SIB7;
1> else:
2> store the received warningMessageSegment;
2> continue reception of SIB7;

The UE should discard any stored warningMessageSegment and the current value of messageIdentifier and serialNumber for SIB7 if the complete warning message has not been assembled within a period of 3 hours.

In option 3, actions upon reception of SIB8 may be performed as below.

Upon receiving the SIB8 the UE shall:
1> if the SIB8 contains a complete warning message and the complete geographical area coordinates (if any):
2> forward the received warning message, messageIdentifier, serialNumber, dataCodingScheme and the geographical area coordinates (if any) to upper layers;
2> continue reception of SIB8 until the end of the current (or the next) modification period or a certain period and then starts or re-starts Timer X;
1> else:
2> if the received values of messageIdentifier and serialNumber are the same (each value is the same) as a pair for which a warning message and the geographical area coordinates (if any) are currently being assembled:
3> store the received warningMessageSegment;
3> store the received warningAreaCoordinatesSegment (if any);
3> if all segments of a warning message and geographical area coordinates (if any) have been received:
4> assemble the warning message from the received warningMessageSegment;
4> assemble the geographical area coordinates from the received warningAreaCoordinatesSegment (if any);
4> forward the received warning message, messageIdentifier, serialNumber, dataCodingScheme and geographical area coordinates (if any) to upper layers;
4> stop assembling a warning message and geographical area coordinates (if any) for this messageIdentifier and serialNumber and delete all stored information held for it;
4> starts or re-starts Timer X;
3> continue reception of SIB8 until the end of the current (or the next) modification period or a certain period and then starts or re-starts Timer X;
2> else if the received values of messageIdentifier and/or serialNumber are not the same as any of the pairs for which a warning message is currently being assembled:
3> start assembling a warning message for this messageIdentifier and serialNumber pair;
3> start assembling the geographical area coordinates (if any) for this messageIdentifier and serialNumber pair;
3> store the received warningMessageSegment;
3> store the received warningAreaCoordinatesSegment (if any);
3> continue reception of SIB8;

The UE should discard warningMessageSegment and warningAreaCoordinatesSegment (if any) and the associated values of messageIdentifier and serialNumber for SIB8 if the complete warning message and the geographical area coordinates (if any) have not been assembled within a period of 3 hours.

The number of warning messages that a UE can re-assemble simultaneously is a function of UE implementation.

The present disclosure can have various advantageous effects.

According to some embodiments of the present disclosure, a wireless device may save power, since the wireless device restricts to receive a system information. More specifically, a wireless device may save the power to receive a system information, since the wireless device skips reading a transmission of the system information while a timer is running.

According to some embodiments of the present disclosure, a wireless device may have a timer per a system information for restricting to receive the system information.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Figure 10:
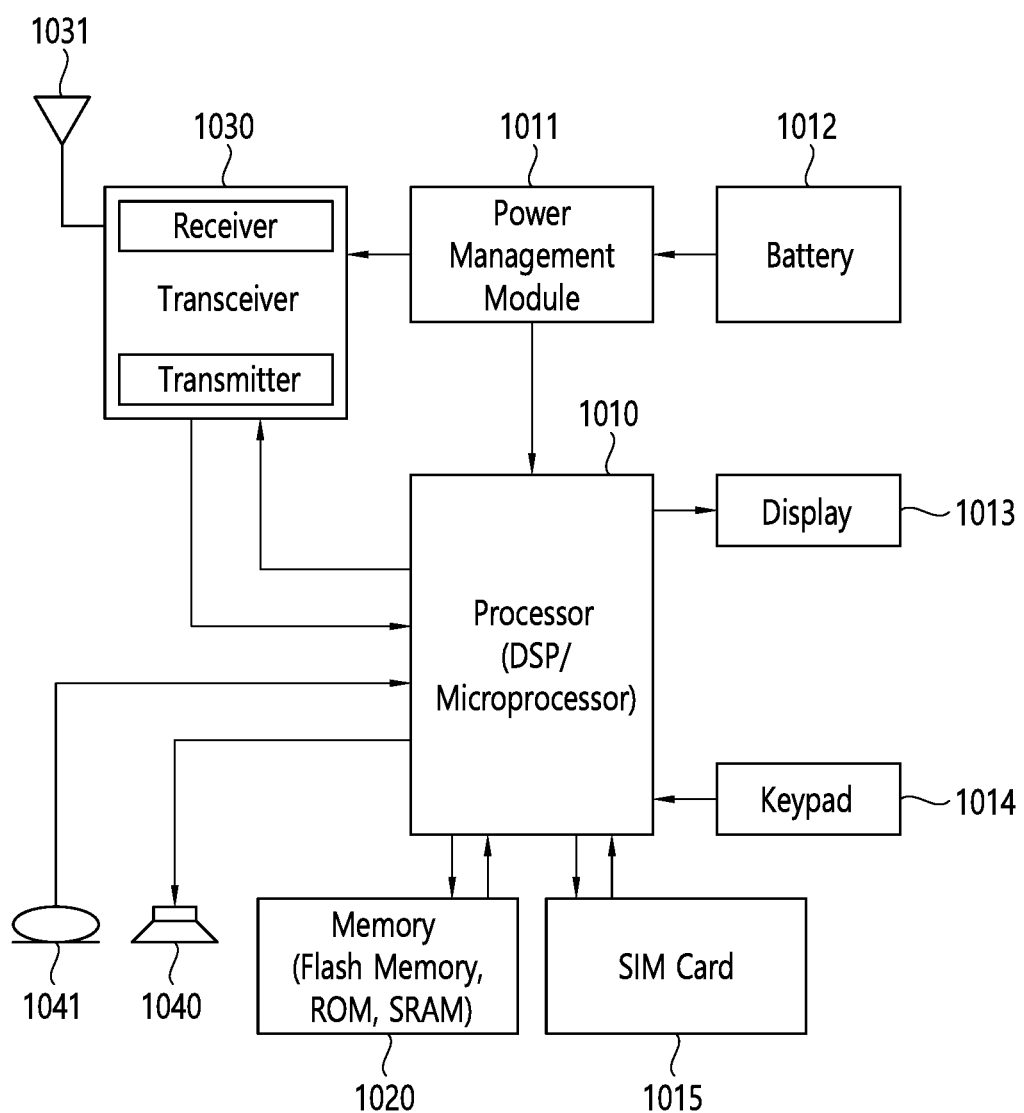
FIG. 10 shows an apparatus to which the technical features of the present disclosure can be applied.

FIG. 10 shows an apparatus to which the technical features of the present disclosure can be applied. The detailed description of the same features as those described above will be simplified or omitted.

An apparatus may be referred to as a wireless device, such as a user equipment (UE), an Integrated Access and Backhaul (IAB), or etc.

A wireless device includes a processor 1010, a power management module 1011, a battery 1012, a display 1013, a keypad 1014, a subscriber identification module (SIM) card 1015, a memory 1020, a transceiver 1030, one or more antennas 1031, a speaker 1040, and a microphone 1041.

The processor 1010 may be configured to implement proposed functions, procedures and/or methods described in this description. Layers of the radio interface protocol may be implemented in the processor 1010. The processor 1010 may include application-specific integrated circuit (ASIC), other chipset, logic circuit and/or data processing device. The processor 1010 may be an application processor (AP). The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

According to some embodiments of the present disclosure, the processor 1010 may be configured to be coupled operably with the memory 1020 and the transceiver 1030. The processor 1010 may be configured to control the transceiver 1030 to receive, from a network, a first transmission of a system information. The processor 1010 may start a timer related to the system information. The processor 1010 may skip reading a second transmission of the system information, while the timer is running.

According to some embodiments of the present disclosure, a processor 1010 of a wireless device may save power, since the processor 1010 control the transceiver 1030 not to receive all of the system information. More specifically, a transceiver 1030 of a wireless device may save the power to receive a system information, since the processor 1010 of wireless device controls the transceiver 1030 to skip reading a transmission of the system information while a timer is running.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 11:
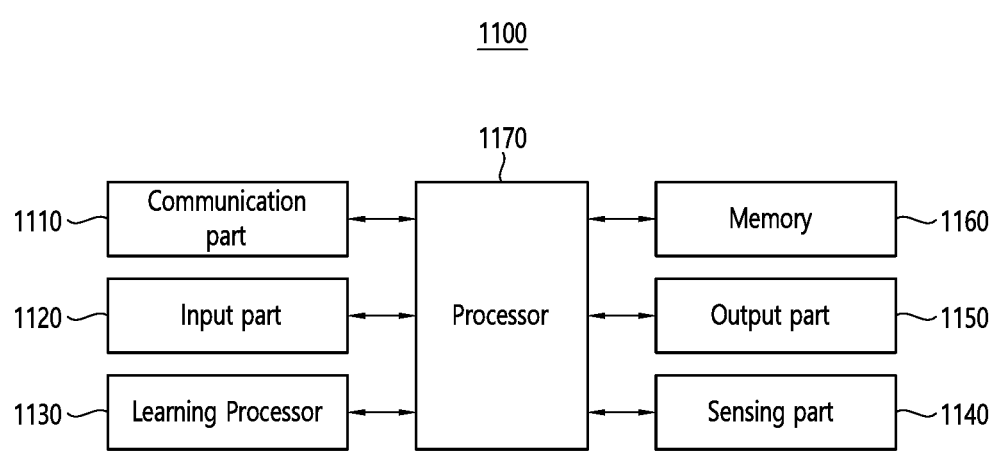
FIG. 11 shows an example of an AI device to which the technical features of the present disclosure can be applied.

FIG. 11 shows an example of an AI device to which the technical features of the present disclosure can be applied.

The AI device 1100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 11, the AI device 1100 may include a communication part 1110, an input part 1120, a learning processor 1130, a sensing part 1140, an output part 1150, a memory 1160, and a processor 1170.

The communication part 1110 can transmit and/or receive data to and/or from external devices such as the AI devices and the AI server using wire and/or wireless communication technology. For example, the communication part 1110 can transmit and/or receive sensor information, a user input, a learning model, and a control signal with external devices. The communication technology used by the communication part 1110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1120 can acquire various kinds of data. The input part 1120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1120 can acquire input data to be used when acquiring an output using learning data and a learning model for model learning. The input part 1120 may obtain raw input data, in which case the processor 1170 or the learning processor 1130 may extract input features by preprocessing the input data.

The learning processor 1130 may learn a model composed of an ANN using learning data. The learned ANN can be referred to as a learning model. The learning model can be used to infer result values for new input data rather than learning data, and the inferred values can be used as a basis for determining which actions to perform. The learning processor 1130 may perform AI processing together with the learning processor of the AI server. The learning processor 1130 may include a memory integrated and/or implemented in the AI device 1100. Alternatively, the learning processor 1130 may be implemented using the memory 1160, an external memory directly coupled to the AI device 1100, and/or a memory maintained in an external device.

The sensing part 1140 may acquire at least one of internal information of the AI device 1100, environment information of the AI device 1100, and/or the user information using various sensors. The sensors included in the sensing part 1140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1150 may generate an output related to visual, auditory, tactile, etc. The output part 1150 may include a display for outputting visual information, a speaker for outputting auditory information, and/or a haptic module for outputting tactile information.

The memory 1160 may store data that supports various functions of the AI device 1100. For example, the memory 1160 may store input data acquired by the input part 1120, learning data, a learning model, a learning history, etc.

The processor 1170 may determine at least one executable operation of the AI device 1100 based on information determined and/or generated using a data analysis algorithm and/or a machine learning algorithm. The processor 1170 may then control the components of the AI device 1100 to perform the determined operation. The processor 1170 may request, retrieve, receive, and/or utilize data in the learning processor 1130 and/or the memory 1160, and may control the components of the AI device 1100 to execute the predicted operation and/or the operation determined to be desirable among the at least one executable operation. The processor 1170 may generate a control signal for controlling the external device, and may transmit the generated control signal to the external device, when the external device needs to be linked to perform the determined operation. The processor 1170 may obtain the intention information for the user input and determine the user's requirements based on the obtained intention information. The processor 1170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1130 and/or learned by the learning processor of the AI server, and/or learned by their distributed processing. The processor 1170 may collect history information including the operation contents of the AI device 1100 and/or the user's feedback on the operation, etc. The processor 1170 may store the collected history information in the memory 1160 and/or the learning processor 1130, and/or transmit to an external device such as the AI server. The collected history information can be used to update the learning model. The processor 1170 may control at least some of the components of AI device 1100 to drive an application program stored in memory 1160. Furthermore, the processor 1170 may operate two or more of the components included in the AI device 1100 in combination with each other for driving the application program.

Figure 12:
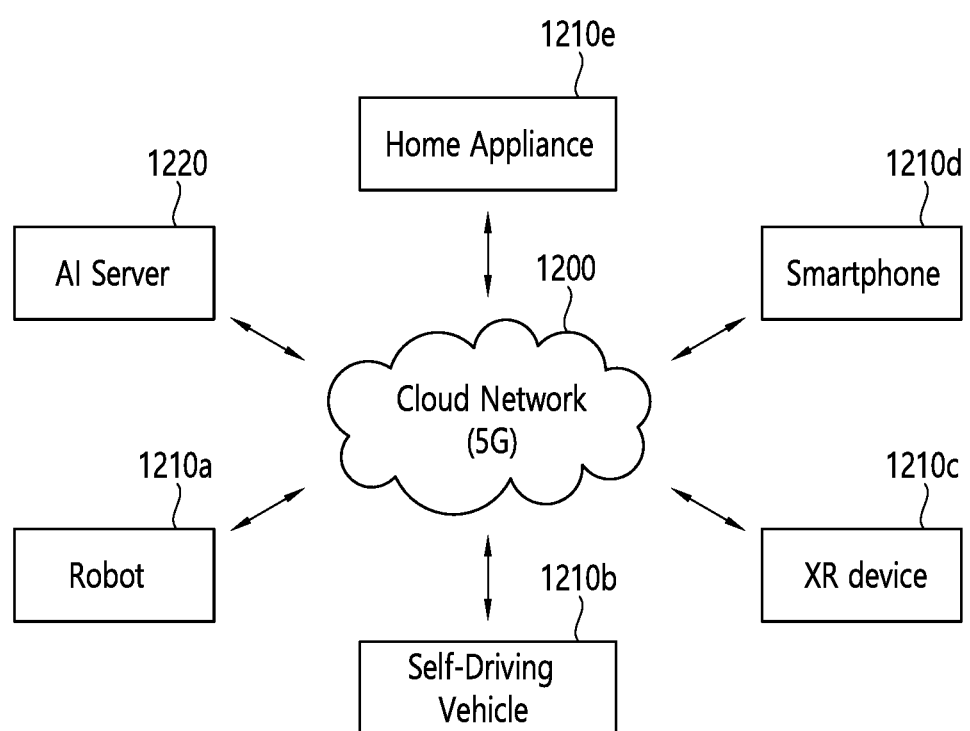
FIG. 12 shows an example of an AI system to which the technical features of the present disclosure can be applied.

FIG. 12 shows an example of an AI system to which the technical features of the present disclosure can be applied.

Referring to FIG. 12, in the AI system, at least one of an AI server 1220, a robot 1210*a*, an autonomous vehicle 1210*b*, an XR device 1210*c*, a smartphone 1210*d* and/or a home appliance 1210*e* is connected to a cloud network 1200. The robot 1210*a*, the autonomous vehicle 1210*b*, the XR device 1210*c*, the smartphone 1210*d*, and/or the home appliance 1210*e* to which the AI technology is applied may be referred to as AI devices 1210*a* to 1210*e*.

The cloud network 1200 may refer to a network that forms part of a cloud computing infrastructure and/or resides in a cloud computing infrastructure. The cloud network 1200 may be configured using a 3G network, a 4G or LTE network, and/or a 5G network. That is, each of the devices 1210*a* to 1210*e* and 1220 consisting the AI system may be connected to each other through the cloud network 1200. In particular, each of the devices 1210*a* to 1210*e* and 1220 may communicate with each other through a base station, but may directly communicate with each other without using a base station.

The AI server 1220 may include a server for performing AI processing and a server for performing operations on big data. The AI server 1220 is connected to at least one or more of AI devices constituting the AI system, i.e. the robot 1210*a*, the autonomous vehicle 1210*b*, the XR device 1210*c*, the smartphone 1210*d* and/or the home appliance 1210*e* through the cloud network 1200, and may assist at least some AI processing of the connected AI devices 1210*a* to 1210*e*. The AI server 1220 can learn the ANN according to the machine learning algorithm on behalf of the AI devices 1210*a* to 1210*e*, and can directly store the learning models and/or transmit them to the AI devices 1210*a* to 1210*e*. The AI server 1220 may receive the input data from the AI devices 1210*a* to 1210*e*, infer the result value with respect to the received input data using the learning model, generate a response and/or a control command based on the inferred result value, and transmit the generated data to the AI devices 1210*a* to 1210*e*. Alternatively, the AI devices 1210*a* to 1210*e* may directly infer a result value for the input data using a learning model, and generate a response and/or a control command based on the inferred result value.

Various embodiments of the AI devices 1210*a* to 1210*e* to which the technical features of the present disclosure can be applied will be described. The AI devices 1210*a* to 1210*e* shown in FIG. 12 can be seen as specific embodiments of the AI device 1100 shown in FIG. 11.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
   receiving, from a network, a first transmission of a system information;
   starting a timer related to the system information;
   skipping to read a second transmission of the system information, while the timer is running;
   receiving, from a network, a first transmission of other system information;
   starting other timer related to the other system information; and
   skipping to read a second transmission of the other system information, while the other timer is running,
   wherein the other timer is different from the timer.

2. The method of claim 1, wherein the method further comprises,
   monitoring a paging occasion to receive an indication for the system information.

3. The method of claim 2, wherein the indication informs that the system information is transmitted from the network.

4. The method of claim 2, wherein the method further comprises,
   skipping to receive the indication, while the timer is running.

5. The method of claim 2, wherein the method further comprises,
   receiving the indication, after the timer is expired.

6. The method of claim 1, wherein the system information is a system information (SI) message, a system information block (SIB), a type of SIB, and/or a warning message.

7. The method of claim 6, wherein the warning message carries Earthquake and Tsunami Warning System (ETWS) data and/or Commercial Mobile Alert System (CMAS) data.

8. The method of claim 6, wherein the SIB includes the warning message or a segment of the warning message.

9. The method of claim 8, wherein the timer is started based on that the warning message is received or all segments of the warning message are received.

10. The method of claim 1, wherein the timer is configured by the system information.

11. The method of claim 1, wherein the method further comprises,
receiving a third transmission of the system information, after the timer is expired.

12. The method of claim 1, wherein the wireless device is an autonomous driving apparatus in communication with at least one of a mobile terminal, a network, and/or autonomous vehicles other than the wireless device.

13. A wireless device in a wireless communication system, the wireless device comprising:
a memory;
a transceiver; and
a processor, operably coupled to the memory and the transceiver, and configured to:
control the transceiver to receive, from a network, a first transmission of a system information;
start a timer related to the system information;
skip reading a second transmission of the system information, while the timer is running;
control the transceiver to receive, from a network, a first transmission of other system information;
start other timer related to the other system information; and
skip to read a second transmission of the other system information, while the other timer is running,
wherein the other timer is different from the timer.

* * * * *